United States Patent [19]
Hearn

[11] Patent Number: 5,510,568
[45] Date of Patent: Apr. 23, 1996

[54] PROCESS FOR THE REMOVAL OF MERCAPTANS AND HYDROGEN SULFIDE FROM HYDROCARBON STREAMS

[75] Inventor: Dennis Hearn, Houston, Tex.

[73] Assignee: Chemical Research & Licensing Company, Pasadena, Tex.

[21] Appl. No.: 353,724

[22] Filed: Dec. 12, 1994

Related U.S. Application Data

[63] Continuation-in-part of Ser. No. 262,033, Jun. 17, 1994, abandoned.

[51] Int. Cl.$^6$ ..................................................... C07C 7/10
[52] U.S. Cl. .......................... 585/834; 585/841; 585/850; 585/867
[58] Field of Search ............................... 585/834, 841, 585/850, 867

[56] References Cited

U.S. PATENT DOCUMENTS

| | | | |
|---|---|---|---|
| 3,671,603 | 6/1972 | Hagemeyer et al. | 260/677 A |
| 3,884,984 | 5/1975 | Hirose et al. | 260/634 |
| 3,960,683 | 6/1976 | Baba | 204/158 R |
| 4,055,483 | 10/1977 | Mertzweiller et al. | 208/213 |
| 4,123,502 | 10/1978 | Hölter et al. | 423/230 |
| 4,731,229 | 3/1988 | Sperandio | 422/188 |
| 4,941,968 | 7/1990 | Reid | 208/236 |
| 5,009,770 | 4/1991 | Miller et al. | 208/209 |
| 5,073,236 | 12/1991 | Gelbein et al. | 203/29 |
| 5,084,259 | 1/1992 | Satek et al. | 423/277 |
| 5,124,027 | 6/1992 | Beaton et al. | 208/309 |
| 5,154,817 | 10/1992 | Reid | 208/48 AA |
| 5,266,546 | 11/1993 | Hearn | 502/300 |
| 5,321,163 | 6/1994 | Hickey et al. | 568/59 |

*Primary Examiner*—Sharon Gibson
*Attorney, Agent, or Firm*—Kenneth H. Johnson

[57] ABSTRACT

A process for treating a light cracked naphtha to be used as an etherification or alkylation feedstock in which the mercaptans and diolefins are removed simultaneously in a distillation column reactor using a Pd catalyst. The mercaptans are reacted with the diolefins to form sulfides which are higher boiling than that portion of the naphtha which is used as feed to the etherification or alkylation unit. $H_2S$ reacts in the same manner as the mercaptans to for the sulfides and is similarly removed from streams. The higher boiling sulfides are removed as bottoms along with any $C_6$ and heavier materials. Any diolefins not converted to sulfides are selectively hydrogenated to mono-olefins for use in the etherification process. Certain $C_5$ olefins, for example pentene-1 and 3-methyl butene-1 are isomerized during the process to more beneficial isomers.

14 Claims, 1 Drawing Sheet

PROCESS FOR THE REMOVAL OF MERCAPTANS AND HYDROGEN SULFIDE FROM HYDROCARBON STREAMS

This application is a continuation in part of U.S. Ser. No. 08/262,033, filed Jun. 17, 1994, now abandoned.

BACKGROUND OF THE INVENTION

Field of the Invention

The present invention relates generally to a process for the removal of mercaptans and/or hydrogen sulfide ($H_2S$) from petroleum distillate streams. More particularly the invention relates to a process wherein the petroleum distillate contains diolefins which are selectively reacted with the mercaptans and/or hydrogen sulfide ($H_2S$) to form sulfides. Most particularly the invention relates to a process wherein the reaction of the mercaptans and/or hydrogen sulfide ($H_2S$) with the diolefins is carried out simultaneously with a fractional distillation to remove the sulfides, and thus the sulfur, from the distillate.

Related Information

Petroleum distillate streams contain a variety of organic chemical components. Generally the streams are defined by their boiling ranges which determine the compositions. The processing of the streams also affects the composition. For instance, products from either catalytic cracking or thermal cracking processes contain high concentrations of olefinic materials as well as saturated (alkanes) materials and poly-unsaturated materials (diolefins). Additionally, these components may be any of the various isomers of the compounds.

The petroleum distillates often contain unwanted contaminants such as sulfur and nitrogen compounds. These contaminants often are catalyst poisons or produce undesirable products upon further processing. In particular the sulfur compounds can be troublesome. The sulfur compounds are known catalyst poisons for naphtha reforming catalysts and hydrogenation catalysts. The sulfur compounds present in a stream are dependent upon the boiling range of the distillate. In a light naphtha (110°– 250° F. boiling range) the predominant sulfur compounds are mercaptans. The most common method for removal of the $H_2S$ and mercaptans is caustic washing of the organic streams.

Another method of removal of the sulfur compounds is by hydrodesulfurization (HDS) in which the petroleum distillate is passed over a solid particulate catalyst comprising a hydrogenation metal supported on an alumina base. Additionally copious quantities of hydrogen are included in the feed. The following equations illustrate the reactions in a typical HDS unit:

(1) $RSH+H_2 \rightarrow RH+H_2S$ (2) $RCl+H_2 \rightarrow RH+HCl$ (3) $2RN+4H_2 \rightarrow RH+NH_3$ (4) $ROOH+2H_2 \rightarrow RH+H_2O$ Typical operating conditions for the HDS reactions are:

| | |
|---|---|
| Temperature, °F. | 600–780 |
| Pressure, psig | 600–3000 |
| $H_2$ recycle rate, SCF/bbl | 1500–3000 |
| Fresh $H_2$ makeup, SCF/bbl | 700–1000 |

As may be seen the emphasis has been upon hydrogenating the sulfur and other contaminating compounds. The sulfur is then removed in the form of gaseous $H_2S$, which in itself is a pollutant and requires further treatment.

In the production of tertiary amyl methyl ether (TAME) for use as a gasoline additive generally a light cracked naphtha (LCN) is used as the source of the olefins for the etherification reaction. This LCN may contain sulfur as a contaminant in the form of mercaptans in concentrations of up to hundreds wppm. These mercaptans are inhibitors for the hydrogenation catalyst used to hydrogenate dienes in the feed to an etherification unit or to an alkylation unit. As noted above, one common method to remove the sulfur compounds has been caustic extraction.

SUMMARY OF THE INVENTION

The present invention presents a new process for the removal of mercaptans and/or hydrogen sulfide ($H_2S$) from aliphatic hydrocarbon streams, containing 4 to 12 carbon atoms. Light cracked stream which is used as a feed to an etherification or alkylation unit is a preferred feed for this process. The light cracked naphtha contains $C_4$'s to $C_8$'s components which may be saturated (alkanes), unsaturated (olefins) and poly-unsaturated (diolefins) along with minor amounts of the mercaptans. The light naphtha is generally depentanized in a fractional distillation column to remove that portion containing the $C_6$ and higher boiling materials ($C_6+$) as bottoms and the $C_5$ and lower boiling materials ($C_5-$) as overheads. One embodiment of the present invention utilizes the upper portion of the depentanizer to react substantially all of the mercaptans and/or hydrogen sulfide ($H_2S$) contained in the light cracked naphtha with a portion of the diolefins to form sulfides which are higher boiling than the $C_5$ fraction containing the amylenes which are fed to the etherification unit. The sulfides are removed as bottoms from the depentanizer column along with the $C_6+$ fraction and can be simply remixed into the final gasoline fraction.

The catalyst used for the reaction is a palladium oxide, preferably 0.1 to 1.0 wt % on an alumina base which has been configured as a catalytic distillation structure.

Hydrogen is provided as necessary to support the reaction and to reduce the oxide and maintain it in the hydride state. The distillation column reactor is operated at a pressure such that the reaction mixture is boiling in the bed of catalyst. A "froth level" may be maintained throughout the catalyst bed by control of the bottoms and/or overheads withdrawal rate which may improve the effectiveness of the catalyst thereby decreasing the height of catalyst needed. As may be appreciated the liquid is boiling and the physical state is actually a froth having a higher density than would be normal in a packed distillation column but less than the liquid without the boiling vapors.

The present process preferably operates at overhead pressure of said distillation column reactor in the range between 0 and 250 psig and temperatures within said distillation reaction zone in the range of 100° to 300° F., preferably 130° to 270° F.

The feed and the hydrogen are preferably fed to the distillation column reactor separately or they may be mixed prior to feeding. A mixed feed is fed below the catalyst bed or at the lower end of the bed. Hydrogen alone is fed below the catalyst bed and the hydrocarbon stream is fed below the bed to about the mid one-third of the bed. The pressure selected is that which maintains catalyst bed temperature between 100° F. ad 300° F.

DESCRIPTION OF THE PREFERRED EMBODIMENTS

Figure 1:
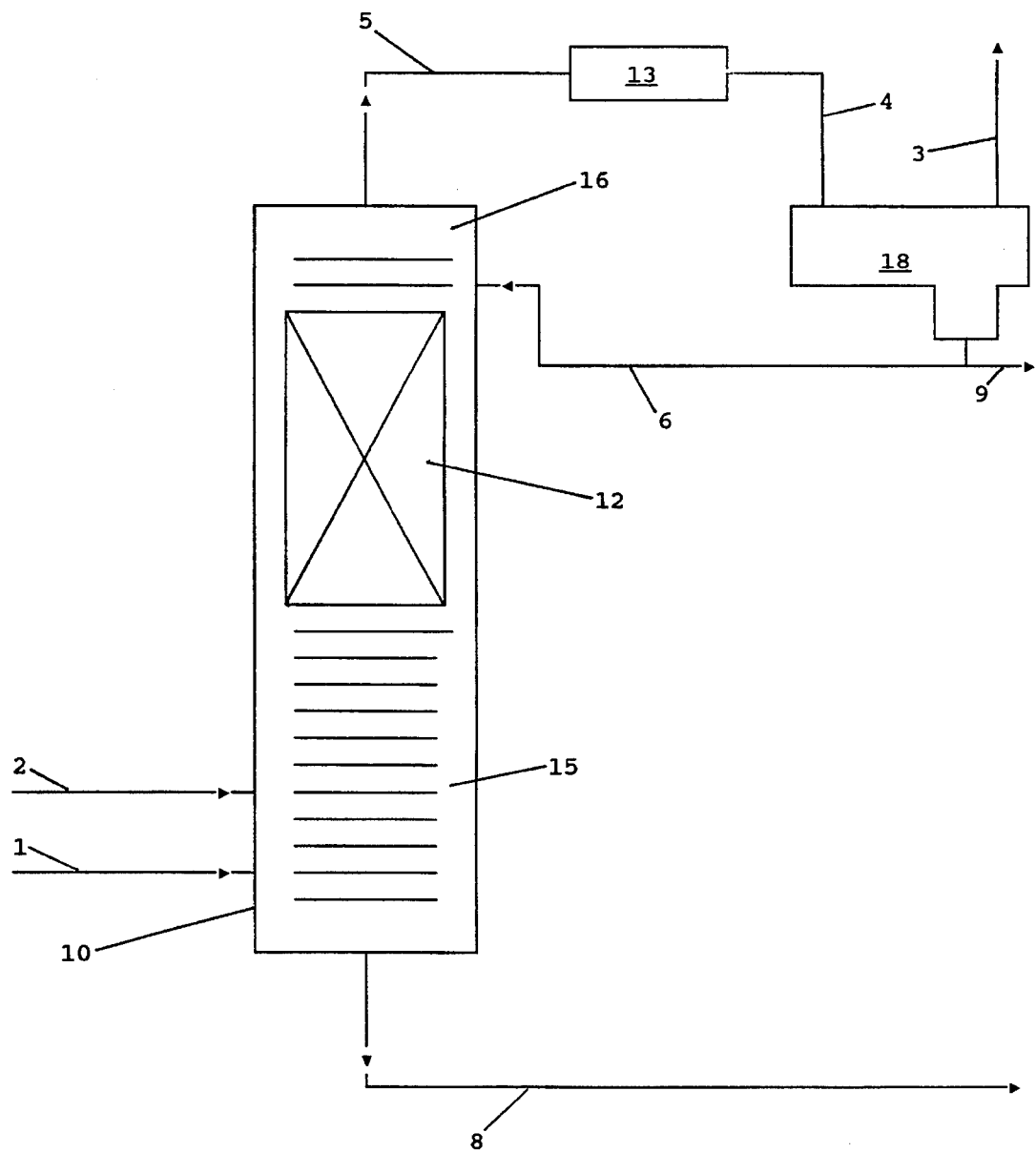
FIG. 1 is a simplified flow diagram of one embodiment of the invention.

The present invention provides a process for the reaction of diolefins within a petroleum distillate with the mercaptans and/or hydrogen sulfide ($H_2S$) within the distillate to form sulfides and concurrent separation of the higher boiling sulfides from the distillate. This requires a distillation column reactor which contains an appropriate catalyst in the form of a catalytic distillation structure.

The $C_5$'s in the feed to the present unit are contained in a single "light naphtha" cut which may contain everything from $C_5$'s through $C_8$'s and higher. This mixture can easily contain 150 to 200 components. Mixed refinery streams often contain a broad spectrum of olefinic compounds. This is especially true of products from either catalytic cracking or thermal cracking processes. Refinery streams are usually separated by fractional distillation, and because they often contain compounds that are very close in boiling points, such separations are not precise. A $C_5$ stream, for instance, may contain $C_4$'s and up to $C_8$'. These components may be saturated (alkanes), unsaturated (mono-olefins), or poly-unsaturated (diolefins). Additionally, the components may be any or all of the various isomers of the individual compounds. Such streams typically contain 15 to 30 weight % of the isoamylenes(total methyl butene isomers).

Such refinery streams also contain small amounts of sulfur which must be removed. The sulfur compounds are generally found in a light cracked naphtha stream as mercaptans and/or hydrogen sulfide ($H_2S$) which poison the hydrogenation catalyst used to selectively hydrogenate diolefins. Removal of sulfur compounds is generally termed "sweetening" a stream.

Several of the minor components (diolefins) in the feed will react slowly with oxygen during storage to produce "gum" and other undesirable materials. However, these components also react very rapidly in the TAME process to form a yellow, foul smelling gummy material and consume acid in an alkylation unit. Thus it is seen to be desirable to remove these components whether the "light naphtha" cut is to be used only for gasoline blending by itself or as feed to a TAME or alkylation process.

Catalysts which are useful in the mercaptan-diolefin reaction include the Group VIII metals. Generally the metals are deposited as the oxides on an alumina support. The supports are usually small diameter extrudates or spheres. The catalyst must then be prepared in the form of a catalytic distillation structure. The catalytic distillation structure must be able to function as catalyst and as mass transfer medium. The catalyst must be suitably supported and spaced within the column to act as a catalytic distillation structure. In a preferred embodiment the catalyst is contained in a woven wire mesh structure as disclosed in U.S. Pat. No. 5,266,546 which is hereby incorporated by reference. Other catalytic distillation structures useful for this purpose are disclosed in U.S. Pat. Nos. 4,731,229 and 5,073,236 which are also incorporated by reference.

Suitable catalysts for the reaction are 0.34 wt % Pd on 7 to 14 mesh $Al_2O_3$ (alumina) spheres, designated as G-68C and 0.4 wt % Pd on 7 to 14 alumina spheres designated as G- 68C-1, supplied by United Catalysts Inc. Typical physical and chemical properties of the catalysts as provided by the manufacturer are as follows:

TABLE I

| Designation | G-68C | G-68C-1 |
|---|---|---|
| Form | Sphere | Sphere |
| Nominal size | 7 × 14 mesh | 7 × 14 mesh |
| Pd. wt % | 0.3 (0.27–0.33) | 0.4 (0.37–0.43) |
| Support | High purity alumina | High purity alumina |

The catalyst is believed to be the hydride of palladium which is produced during operation. The hydrogen rate to the reactor must be sufficient to maintain the catalyst in the active form because hydrogen is lost from the catalyst by hydrogenation, but kept below that which would cause flooding of the column which is understood to be the "effectuating amount of hydrogen" as that term is used herein. Generally the mole ratio of hydrogen to diolefins and acetylenes in the feed is at least 1.0 to 1.0 and preferably at least 2.0 to 1.0 and more preferably at least 10.0 to 1.

The catalyst also catalyzes the selective hydrogenation of the polyolefins contained within the light cracked naphtha and to a lesser degree the isomerization of some of the mono-olefins. Generally the relative absorption preference is as follows:

(1) Sulfur compounds
(2) diolefins
(3) mono-olefins

If the catalyst sites are occupied by a more strongly absorbed species, reaction of these weaker absorbed species cannot occur.

The reaction of interest is the reaction of the mercaptans and/or hydrogen sulfide ($H_2S$) with diolefins. The equation of interest which describes the reaction is:

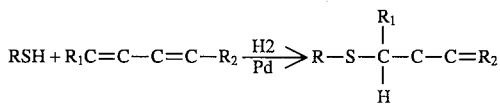

Where R, $R_1$ and $R_2$ are independently selected from hydrogen and hydrocarbyl groups of 1 to 20 carbon atoms.

This may be compared to the HDS reaction which consumes hydrogen. The only hydrogen consumed in the removal of the mercaptans and/or hydrogen sulfide ($H_2S$) in the present invention is that necessary to keep the catalyst in the reduced "hydride" state. If there is concurrent hydrogenation of the dienes, then hydrogen will be consumed in that reaction.

Typical of the mercaptan compounds which may be found to a greater or lesser degree in a light cracked naphtha are: methyl mercaptan (b.p. 43° F.), ethyl mercaptan (b.p. 99° F.), n-propyl mercaptan (b.p. 154° F.), iso-propyl mercaptan (b.p. 135°–140° F.), iso-butyl mercaptan (b.p. 190° F.), tert-butyl mercaptan (b.p. 147° F.), n-butyl mercaptan (b.p. 208° F.), sec-butyl mercaptan (b.p. 203° F.), iso-amyl mercaptan (b.p. 250° F.) , n-amyl mercaptan (b.p. 259° F.) , α-methylbutyl mercaptan ( b.p. 234° F.) , e -ethylpropyl mercaptan (b.p. 293° F.) , n-hexyl mercaptan (b.p. 304° F.), 2-mercapto hexane (b.p. 284° F.), and 3-mercapto hexane (b.p. 135° F. at 20 mm Hg) .

Typical diolefins in the $C_5$ boiling range fraction include: isoprene (2-methyl butadiene-1,3), cis and trans piperylenes (cis and trans 1,3-pentadienes), cyclopentadiene, and minor amounts of butadienes. Analogous dienes exist throughout the range of hydrocarbons useful in the present process.

In the $C_5$ streams, there are several $C_5$ olefin isomers, some being less desirable in the etherifications and alkylations to which the streams are dedicated. In the present process at least two of the lesser desired isomers, pentene-1 and 3-methyl butene-1 are isomerized to more reactive isomers, e.g. pentene-3 and 1-methyl butene-1, respectively.

The present invention can be carried out in a catalyst packed column which can be appreciated to contain a vapor phase ascending and some liquid phase as in any distillation. However since the liquid is held up within the column by artificial "flooding", it will be appreciated that there is an increased density over that when the liquid is simply descending because of what would be normal internal reflux.

Referring now to FIG. 1 there is depicted a simplified flow diagram of one embodiment of the invention. Light cracked naphtha and hydrogen are fed to a depentanizer configured as a distillation column reactor 10 via flow lines 2 and 1 respectively. The $C_6$ and heavier materials are removed in the lower stripping section 15. The $C_5$ and lighter material, including the mercaptans, are distilled up into the reaction distillation zone 12 containing the catalytic distillation structure. In the reaction distillation zone 12 substantially all of the mercaptans react with a portion of the diolefins to form higher boiling sulfides which are distilled downward into the stripping section 15 and removed. as bottoms via line 8 along with the $C_6$ and heavier material. A rectifying section 16 is provided to insure separation of the sulfides.

The $C_5$ and lighter distillate ($C_5$−), less the mercaptans and/or hydrogen sulfide ($H_2S$), are removed as overheads via flow line 5 and passed through condenser 13 where the condensible materials are condensed. The liquids are collected in accumulator 18 where the gaseous materials, including any unreacted hydrogen, are separated and removed via flow line 3. The unreacted hydrogen may be recycled (not shown) if desired. The liquid distillate product is removed via flow line 9. Some of the liquid is recycled to the column 10 as reflux via line 6.

Generally the $C_5$ and lighter material will be used as feed stock for a etherification unit where the isoamylenes contained therein will be converted to TAME or tertiary amyl ethyl ether (TAEE). This TAME or TAEE is recombined with the $C_6$ bottoms and sent to gasoline blending. While the $C_6$ and heavier materials contain the sulfides, the total sulfur content is still acceptably low.

EXAMPLE 1

In this example a three inch diameter column is loaded with 30 ft of the catalyst (G-68C) as distillation structure in the upper portion of the column. The lower 70 ft are filled with inert distillation packing. A light naphtha having the following characteristics is fed to the column.

| | |
|---|---|
| Mercaptan content, wppm | 10 |
| Diolefin content, wt % | 0.254 |

The conditions and results are shown in TABLE II below.

TABLE II

| Conditions: | |
|---|---|
| Light Naphtha feed rate, lbs/hr | 218 |
| $H_2$ feed rate, lb mole/hr | 0.04 |
| Overhead pressure, psig | 125 |
| Middle catalyst bed temperature, °F. | 265 |
| Bottoms rate, lbs/hr | 176 |
| Overheads distillate product, lbs/hr | 42 |

TABLE II-continued

| Results: | |
|---|---|
| Mercaptans in overheads distillate, wppm | 0.6 |
| Diolefin content, wt % | 0.001 |

EXAMPLE 2

Using the same column arrangement and the G-68C-1 catalyst a $C_5$ light naphtha fraction of the following characteristics is fed to the column:

| | |
|---|---|
| Mercaptan content, wppm | 100 |
| Diolefin content, wt % | 1.21 |

The conditions and results are shown in TABLE III below.

TABLE III

| Conditions: | |
|---|---|
| Light Naphtha feed rate, lbs/hr | 218 |
| $H_2$ feed rate, SCFH | 10 |
| Overhead pressure, psig | 100 |
| Middle catalyst bed temperature, °F. | 265 |
| Bottoms rate, lbs/hr | 177 |
| Overheads distillate product, lbs/hr | 41 |
| Feed % $C_5$'s | 21.9% |
| Results: | |
| Mercaptans in overheads distillate, wppm | 0.0 |
| Diolefin content, wt % | 0.0050 |
| Weight Ratio: | |
| (1) Pentene-1/Total Pentenes in | 19% |
| (2) Pentene-1/Total Pentenes out | 5.8% |
| (3) 3 methyl butene-1/isoamylenes in | 4.8% |
| (4) 3 methyl butene-1/isoamylenes out | 1.4% |

The invention claimed is:

1. A process for removing mercaptans and/or hydrogen sulfide from a hydrocarbon stream, comprising the steps of:
   (a) feeding diolefins and a hydrocarbon stream containing mercaptans and/or hydrogen sulfide to a distillation column reactor into a feed zone;
   (b) feeding hydrogen to said distillation column reactor in an amount sufficient to maintain the catalyst in the active form but below that which would cause flooding of the column
   (c) concurrently in said distillation column reactor
      (i) contacting the diolefins with said mercaptans, hydrogen sulfide or mixtures thereof contained within said hydrocarbon stream in the presence of hydrogen in a distillation reaction zone containing a supported Group VIII metal oxide catalyst prepared in a form to act as a catalytic distillation structure thereby reacting a portion of said mercaptans and/or hydrogen sulfide with a portion of the diolefins to form sulfide products and a distillate product, having a reduced mercaptan and/or hydrogen sulfide content and
      (ii) separating said sulfides from said distillate product by fractional distillation;
   (d) withdrawing distillate product from said distillation column reactor at a point above said distillation reaction zone, said distillate product having a reduced mercaptan and/or hydrogen sulfide content; and (e) withdrawing sulfide products from said distillation column reactor at a point below said distillation reaction zone.

2. The process according to claim 1 wherein said hydrocarbon stream is a light cracked naphtha distillate containing a $C_5$ and lighter fraction and a $C_6$ and heavier fraction, said $C_5$ and lighter fraction is removed as overheads from said distillation column reactor and said $C_6$ and heavier fraction is removed as bottoms from said distillation column reactor.

3. The process according to claim 1 wherein there is a molar excess of diolefins to mercaptans and/or hydrogen sulfide.

4. The process according to claim 3 wherein substantially all of said mercaptans and/or hydrogen sulfide are reacted with diolefins to form sulfide products and said distillate product is substantially mercaptan and/or hydrogen sulfide free.

5. The process according to claim 3 wherein substantially all of said excess of diolefins not reacted with mercaptans and/or hydrogen sulfide are hydrogenated to mono-olefins.

6. The process according to claim 1 wherein said diolefins are contained in said hydrocarbon stream.

7. A process for treating a light cracked naphtha distillate for use as an etherification and/or alkylation feed stock, comprising the steps of:

(a) feeding a light cracked naphtha distillate containing mercaptans and/or hydrogen sulfide and diolefins to a distillation column reactor having a stripping zone and distillation reaction zone, said light cracked naphtha having a $C_6+$ fraction and a $C_5-$ fraction;

(b) feeding hydrogen to said distillation column reactor in an amount sufficient to maintain the catalyst in the active form but below that which would cause flooding of the column (c) separating said $C_6+$ fraction from said $C_5-$ fraction in said stripping zone and distilling said $C_5-$ fraction up into said distillation reaction zone;

(d) concurrently in said distillation reaction zone
  (i) contacting the diolefins and mercaptans and/or hydrogen sulfide contained within said light cracked naphtha in the presence of hydrogen in a distillation reaction zone containing a Group VIII metal oxide catalyst supported on a particulate alumina base prepared in a form to act as a catalytic distillation structure thereby reacting a portion of said mercaptans and/or hydrogen sulfide with a portion of the diolefins to form sulfide products and a distillate product,
  (ii) selectively hydrogenating any remaining diolefins to mono-olefins, and
  (ii) separating said sulfides from said distillate product by fractional distillation;

(e) withdrawing a $C_5-$ distillate product from said distillation column reactor as overheads, said $C_5-$ distillate product having a reduced hydrogen sulfide, mercaptan and diolefin content; and (f) withdrawing said sulfide products from said distillation column reactor as bottoms along with said $C_{6+}$ fraction.

8. The process according to claim 7 wherein there is a molar excess of diolefins to mercaptans and/or hydrogen sulfide within said light cracked naphtha stream.

9. The process according to claim 7 wherein substantially all of said mercaptans react with diolefins to produce sulfide products producing a substantially mercaptan and/or hydrogen sulfide free $C_5-$ distillate product.

10. A process for treating a light cracked naphtha distillate for use as an etherification and/or alkylation feed stock, comprising the steps of:

(a) feeding a light cracked naphtha distillate containing mercaptans, $H_2S$ or mixtures thereof and a molar excess of diolefins to said mercaptans to a distillation column reactor having a stripping zone and distillation reaction zone, said light cracked naphtha having a $C_6+$ fraction and a $C_5-$ fraction;

(b) feeding hydrogen to said distillation column reactor in an amount sufficient to maintain the catalyst in the active form but below that which would cause flooding of the column (c) separating said $C_6+$ fraction from said $C_5-$ fraction in said stripping zone and distilling said $C_5-$ fraction up into said distillation reaction zone;

(d) concurrently in said distillation reaction zone
  (i) contacting the diolefins and mercaptans contained within said light cracked naphtha in the presence of hydrogen in a distillation reaction zone containing a Group VIII metal oxide catalyst supported on a particulate alumina base prepared in a form to act as a catalytic distillation structure thereby reacting substantially all of said mercaptans with a portion of the diolefins to form sulfide products and a distillate product,
  (ii) selectively hydrogenating the remaining diolefins to mono-olefins, and
  (iii) separating said sulfides from said distillate product by fractional distillation;

(e) withdrawing a $C_5-$ distillate product from said distillation column reactor as overheads, said $C_5-$ distillate product having a substantially reduced mercaptan and diolefin content; and (f) withdrawing said sulfide products from said distillation column reactor as bottoms along with said $C_6+$ fraction.

11. The process according to claim 11 wherein said cracked light naphtha contains pentene-1 and 3-methyl butene-1 which are isomerized.

12. The process according to claim 1 wherein said Group VIII metal is palladium.

13. The process according to claim 7 wherein said Group VIII metal is palladium.

14. The process according to claim 10 wherein said Group VIII metal is palladium.

\* \* \* \* \*